April 2, 1957 M. M. CUNNINGHAM 2,787,309
FILLER FITTING FOR FLEXIBLE CONTAINERS
AND METHOD OF INSTALLING THE SAME
Filed March 22, 1952 2 Sheets-Sheet 1
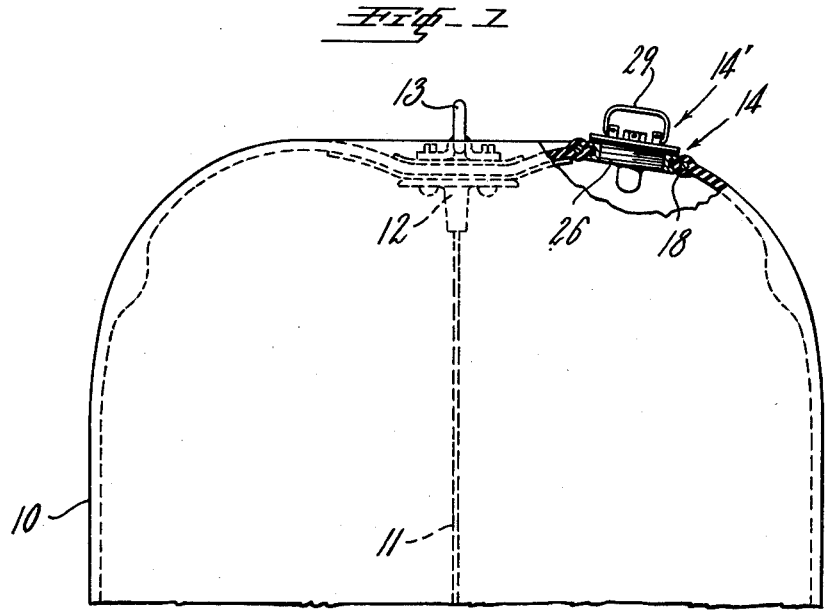
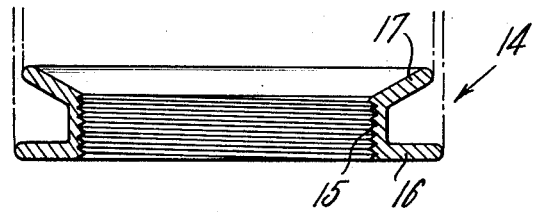
INVENTOR.
MARION M. CUNNINGHAM
BY
Charles E. Willson
ATTORNEY

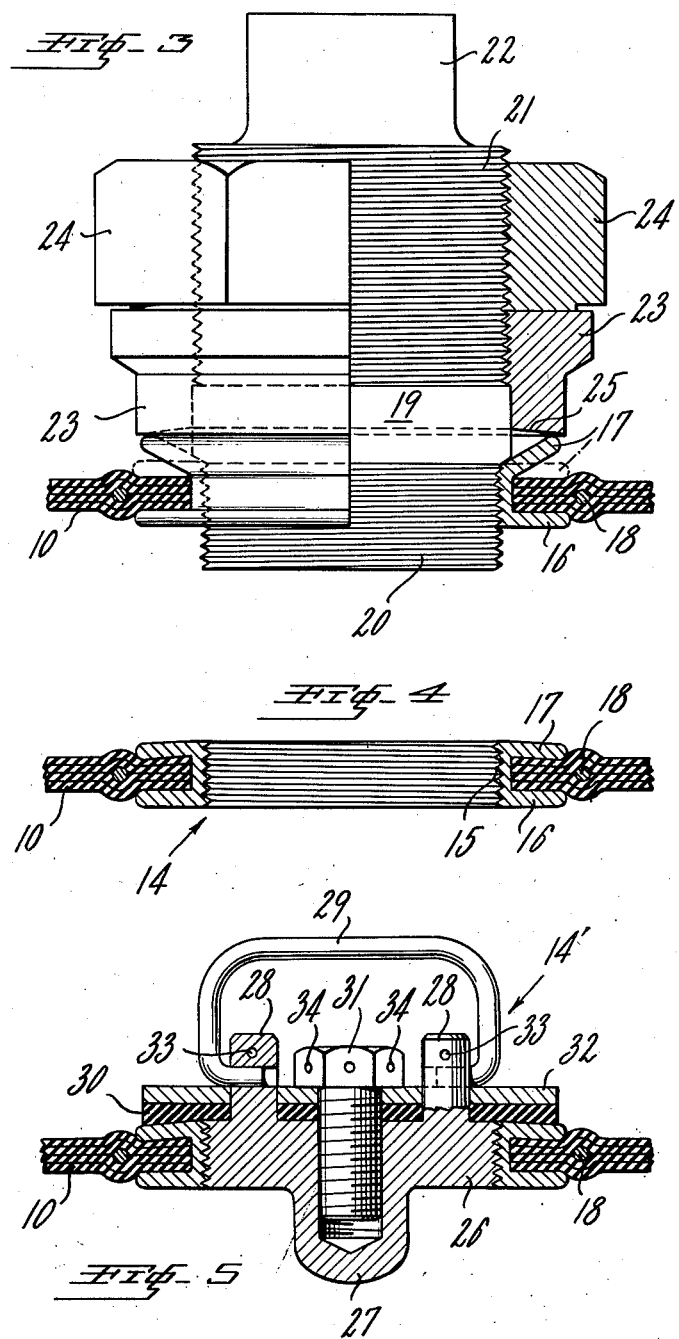

United States Patent Office 2,787,309
Patented Apr. 2, 1957

2,787,309

FILLER FITTING FOR FLEXIBLE CONTAINERS AND METHOD OF INSTALLING THE SAME

Marion M. Cunningham, Woonsocket, R. I., assignor to United States Rubber Company, New York, N. Y., a corporation of New Jersey Application March 22, 1952, Serial No. 277,998

3 Claims. (Cl. 150—8)

This invention relates to filler fittings for flexible containers such as a flexible drum formed of a plurality of plies of coated fabric, and to the method of installing such fitting in position to cooperate with a reinforcing ring previously placed in a wall of the flexible container.

In my Patent No. 2,559,064 for Fitting for Flexible Containers there is shown and described a filling and drain fitting that forms a bung hole for a flexible container, and in such patent the fitting cooperates with a reinforcing ring buried in the flexible container wall. The filling fitting of such patent has a threaded metal sleeve provided with an outwardly flaring flange at its lower end adapted to rest against the inner face of the container wall, and engaging this sleeve is a separate flange-ring adapted to be held by the sleeve in clamping engagement with the outer wall of the container.

The present invention contemplates a one piece filler fitting in place of the two piece filler fitting of said patent. The filler fitting of the present invention, like the filler fitting of said patent is designed for use in a flexible reinforced-fabric container that is preferably formed of two or more plies of cord fabric, and when so used it is important that such filler fitting cooperate with a reinforcing ring buried between the plies forming the walls of the flexible drum or container. If such reinforcing ring is not employed it is difficult to prevent the fitting from tearing out of the filling hole formed in the flexible container, when the container is subjected to internal pressure.

The present invention is therefore directed to a one piece filler fitting comprising an internally threaded metal sleeve having extended outward therefrom near its ends a lower flange and an upper flange, that are adapted to abut firmly against the inner and outer walls respectively of the container when this fitting is installed. Since the fitting of the present invention cooperates with the reinforcing ring buried in a wall of the container in position to surround the filler hole, an important feature of the present invention resides in the construction of the one piece filler fitting to facilitate its installation in the container in position to cooperate with the reinforcing ring just mentioned, and in a novel method of installing such fitting so that its flanges will firmly grip the container walls inside of and close to the reinforcing ring.

In carrying out the present invention the filler fitting for the container opening, as manufactured, comprises an internally threaded metal sleeve having extending outwardly therefrom near its lower end a laterally disposed flange, and extending outwardly therefrom near its upper end a flange that slopes upwardly at a substantial inclination to the lower flange. The construction is such that this fitting can be forced through the filling opening of the container which is surrounded by the above mentioned reinforcing ring. Then the upwardly inclined flange of the fitting can be forced outwardly through the filling opening of the container from a position inside of the container, so that the flexible wall of the container surrounding said opening will be positioned in the annular space between the two flanges of the fitting. The upwardly inclined flange which is now disposed at the outer wall of the container is then forced downwardly, in a manner to be explained, into firm gripping engagement with the flexible outer wall of the container to cooperate with the lower flange and above mentioned reinforcing ring to firmly secure the fitting in place.

It is contemplated that the filler fitting of the present invention will be used in flexible containers or drums of various sizes, but more particularly for a 55 gallon drum designed to be used in shipping liquids in interstate commerce. Such drums must be strongly constructed and capable of resisting high internal pressures. Therefore the one piece fitting contemplated by the present invention must be made of relatively thick metal and must be clamped very firmly to the flexible walls of the container in order to avoid leakage. It therefore follows that after the fitting has been positioned in the opening in the container, in the manner above described, with the upper flange sloping upwardly at a pronounced angle to the lower flange, it is necessary to exert a heavy pressure upon this upper flange in order to force it downwardly into clamping engagement with the outer wall of the container, and at this time care should be taken to prevent distortion of the annular shape of the internally threaded metal sleeve.

Another important feature of the present invention resides in the method of and apparatus for forcing the upper inclined flange of the installed filler fitting downwardly into firm gripping engagement with the outer wall of the container. This is accomplished in accordance with the present invention by providing a threaded-mandrel adapted to be screwed tightly into the threaded opening of the fitting ring after the fitting is in place in the filler hole of the container. The upwardly inclined flange is then forced downwardly, while the lower flange is held in contact with the inner face of the container wall, by providing a collar on said mandrel and by forcing this collar downwardly along said mandrel under sufficient pressure to bend the upwardly flaring flange downwardly into firm clamping engagement with the outer wall of the container, to thereby secure this fitting firmly in place.

The one piece filler fitting contemplated by the present invention is particularly well adapted for use in the above mentioned type of shipping container when the same is to be employed to ship corrosive liquids. When the container is so employed the fitting just described and a fitting closure to be described, are preferably formed of a metal alloy that is highly corrosive resistant. A still further feature of the present invention, therefore, resides in a closure cap or plug adapted to be screwed into the threaded fitting and which is provided with a gasket positioned to overlie the line between the closure fitting and plug threaded therein, and having means for tightly clamping this gasket in place to prevent the corrosive contents of the container from escaping around the closure plug.

The above and other features of the present invention will be further understood from the following description when read in connection with the accompanying drawings, wherein:

Fig. 1 is a side view with parts in section of the upper portion of a flexible container equipped with the closure fitting of the present invention;

Fig. 2 is a vertical sectional view through a filler fitting constructed in accordance with the present invention;

Fig. 3 is a side view with parts in section showing the fitting of Fig. 2 and means associated therewith for bending the upper fitting flange into clamping engagement with the adjacent portion of the flexible container;

Fig. 4 is a vertical sectional view of the filler fitting shown attached to the container wall; and Fig. 5 is a view similar to Fig. 4 but showing a closure cap or plug in its closed position.

The filler and drain fitting contemplated by the present invention may be employed to form the bung hole of various types of flexible containers or drums, but is preferably employed for a reinforced rubber drum such as the cord fabric drum that is described and claimed in my copending application Serial No. 131,407, filed December 6, 1949, now Patent Number 2,612,924, issued October 7, 1952. Such a drum, the upper portion of which is shown in Fig. 1 of the drawing is designated by the numeral 10. This drum preferably is symmetrical in shape and has opposite convex ends near the outer periphery of the drum, and each end is concaved at its central area. The center end portions are held dished inwardly by the central cable 11 which is attached to a suitable fitting 12 secured to each end of the container, as more fully set forth in the above mentioned application. This fitting 12 is shown as having the lifting ring 13 attached thereto.

The present invention, as above stated, relates more particularly to the filler fitting 14 having cooperating therewith the closure plug or cap 14'. This filler fitting is preferably mounted at one end of the flexible container as shown in Fig. 1.

The filler fitting 14 as manufactured is formed as shown in Fig. 2 and comprises an internally threaded metal sleeve 15 having a lower horizontally extending flange 16 and an upper flange 17 that extends upwardly at a substantial inclination to the lower flange. The annular space between these two flanges is adapted to receive the portion of a flexible container wall that surrounds the filler opening cut in the container.

The flexible container 10 is preferably formed of a plurality of plies of cord fabric arranged so that the cords of one ply are disposed at a substantial angle to the next ply. Such cord fabric possesses substantial strength only in a direction in which the cords extend, and if a hole is cut in a container formed of such cord fabric, the walls surrounding such holes are not strong, unless reinforced with some type of metal fitting. In order to increase the strength of the wall structure surrounding such hole a reinforcing ring 18 is preferably buried between the plies of the container wall in surrounding relation with such opening, so that when the fitting 14 is installed it will cooperate with this reinforcing ring 18 to provide a very strong container construction.

If an integral filler fitting such as designated by 14 is employed in a flexible wall container having the reinforcing ring 18, a difficulty arises in introducing this fitting 14 in the opening formed in the container when such opening is reinforced with the ring 18 and the flanges 16 and 17 of such fitting are sufficiently large in diameter to extend close to the reinforcing ring when the fitting is secured in its final position.

This difficulty is solved, in accordance with the present invention, by making the filler fitting 14 as shown in Fig. 2 of the drawing so that the upper flange 17 inclines upwardly at a pronounced angle to the lower flange 16. This causes the outside diameter of the upper flange 17 to be considerably smaller than the outside diameter of the lower flange 16 as indicated by the dot and dash lines in Fig. 2.

After a hole has been cut in the flexible wall of the container 10 of a diameter to fit closely around the outer cylinder portion of the sleeve 15, the fitting 14 can be forced edgewise through this hole surrounded by the ring 18, to a position inside of the container 10. In order to facilitate this it is possible to spring the reinforcing ring 18 slightly out of round momentarily to promote the passage of the fitting 14 therethrough. After this fitting has been introduced inside of the container as just described, the upper incline flange 17 can be forced outwardly through the hole cut in the drum wall, due to the reduced diameter of such flange 17. This will cause the flexible container wall surrounding the drum opening to lie in the space between the flanges 16 and 17 as shown in Fig. 3.

The next step in securing this fitting 14 tightly in place in the flexible container is preferably carried out by using the mechanism shown in Fig. 3 of the drawing, and which comprises the threaded-mandrel 19 having the lower threaded portion 20 and upper threaded portion 21. The upper end of this mandrel is provided with a squared end portion 22 adapted to be engaged by a wrench. In using this mandrel the threaded lower portion 20 thereof is screwed tightly into the fitting 14 as shown in Fig. 3. This serves to internally brace the fitting ring so that it cannot be sprung out of shape and also anchors the mandrel strongly to the fitting so that it will not be pulled therefrom during application of the flange bending pressure. The mandrel 19 has slidably mounted thereupon a collar 23, and the threaded portion 21 of the mandrel is provided with the rotating nut 24. The arrangement is such that if the mandrel is held from turning by a wrench or the like engaging the portion 22 thereof, and the nut 24 is rotated under sufficient force to push the collar 23 downwardly, this collar will gradually stretch and bend the flange 17 downwardly into the dotted line position of Fig. 3. It should be noted that the lower face 25 of the collar 23 slopes downwardly slightly towards its outer edge, so that this collar will serve to bend the flange 17 downwardly slightly below its horizontal position. This causes the fitting 14 to squeeze the flexible drum wall 10 tightly adjacent the reinforcing ring 18, and also sets the flange 17 in a slightly downwardly incline position so that it will be better able to resist any tendency of the same to spring upwardly when the bending pressure of the sleeve 23 is relieved therefrom.

Various types of closure plugs or caps may be used with the filler fitting 14 and the closure cap 14' shown in the drawings is well adapted to maintain a seal over the threaded portion of the fitting and cap to prevent any of the liquid contents of the container from escaping adjacent said threads.

The cap 14' is best shown in Fig. 5 of the drawing and comprises the externally threaded plug 26 adapted to be screwed into the sleeve 15, and this plug is shown as having the inwardly extending boss 27. The plug 26 is also provided with the upwardly extending lugs 28 adapted to have a supporting handle or bail 29 secured thereto. The plug 26 is constructed to be screwed into the fitting 14 so that its outer face will be flush with the top of the fitting 14. The plug 26 is provided with a gasket or rubber washer 30 which is considerably larger in diameter than the plug as shown, and this washer has holes formed therein through which the lugs 28 may extend as shown. The plug 26 has a central hole drilled therein which extends downwardly into the boss 27 and this hole is threaded to receive the clamping bolt 31, the head of which engages a clamping disk 32. The arrangement is such that the plug 14' formed as just described is screwed by hand into the fitting 14 to lie flush with the top of the fitting 14, and then in order to seal the gasket 30 over the threads of the fitting 14 the bolt 31 is tightened to force the metal disk downwardly into tight clamping engagement with the gasket 30. This forms a tight seal that bridges the threaded portion of the fitting to prevent liquid from escaping at the top of the threads. It also makes it very difficult to unscrew the plug to obtain access to the liquid in the container unless the bolt 31 is first backed off. In order to prevent tampering with the contents within the container a sealing wire, not shown, may be threaded through holes 33 in the lugs 28 and through a hole 34 in the bolt 31, so that this bolt cannot be turned without breaking the seal.

It will be seen from the foregoing that the present invention provides a simple, strong and durable filler fitting for a flexible drum or container, and also provides a highly satisfactory closure plug that cooperates with the filler fitting so that danger of the liquid being shipped leaking around the fitting cap is effectively guarded against.

Having thus described my invention, what I claim and desire to protect by Lettters Patent is:

1. The method of providing a nonmetallic flexible walled container with a metal filler and drain fittings, which comprises burying in a nonmetallic wall of the container a strengthening ring and cutting a hole through the wall inside such ring, forcing into said hole an internally threaded metal sleeve having near its ends an outwardly extending lower flange and an upper flange that extends upwardly at a substantial angle to the lower flange and extends outwardly at a substantial inclination to said sleeve so that the flexible wall surrounding said opening lies in the annular space between said flanges, screwing a threaded-mandrel into the threaded sleeve, and forcing a flange bending collar along the mandrel to thereby bend the upper flange downwardly into firm clamping engagement with the upper face of the container wall projecting inwardly from said ring to thereby secure the fitting firmly in place.

2. The method of providing a nonmetallic flexible walled container with a metal filler and drain fitting, which comprises burying in a nonmetallic wall of the container a strengthening ring and cutting a hole through the wall inside such ring, inserting in said hole an internally threaded metal sleeve having near its ends an outwardly extending lower flange and an upper flange that extends upwardly at a substantial angle to the lower flange and extends outwardly at a substantial inclination to said sleeve so that the flexible wall surrounding said opening lies in the annular space between said flanges, screwing a threaded-mandrel into the threaded sleeve, and forcing a flange bending collar along the mandrel to thereby bend the upper flange downwardly beyond its horizontal central plane position into gripping engagement with the upper face of the container wall inside of and close to said ring to secure the fitting firmly in place.

3. The method of providing a nonmetallic flexible walled container with a metal fitting for an opening therethrough, which comprises inserting in a hole in a flexible walled container an internally threaded metal sleeve having near its ends an outwardly extending first flange and a second flange that extends away from and at a substantial angle to the first flange and extends outwardly at a substantial inclination to said sleeve so that the flexible wall surrounding said opening lies in the annular space between said flanges, screwing a threaded-mandrel into the threaded sleeve, and forcing a flange bending collar along the mandrel to thereby bend the second flange into firm clamping engagement with the face of the container wall projecting inwardly between said flanges to thereby secure the fitting firmly in place.

References Cited in the file of this patent

UNITED STATES PATENTS

| | | |
|---|---|---|
| 1,340,236 | Moehle | May 18, 1920 |
| 1,588,847 | McGee | June 15, 1926 |
| 2,226,496 | Jacocks | Dec. 24, 1940 |
| 2,243,289 | Schwartz | May 27, 1941 |
| 2,254,924 | Williams | Sept. 2, 1941 |
| 2,260,149 | Meek | Oct. 21, 1941 |
| 2,271,762 | Draper | Feb. 3, 1942 |
| 2,559,064 | Cunningham | July 3, 1951 |
| 2,612,924 | Cunningham | Oct. 7, 1952 |